United States Patent Office 2,923,235
Patented Feb. 2, 1960

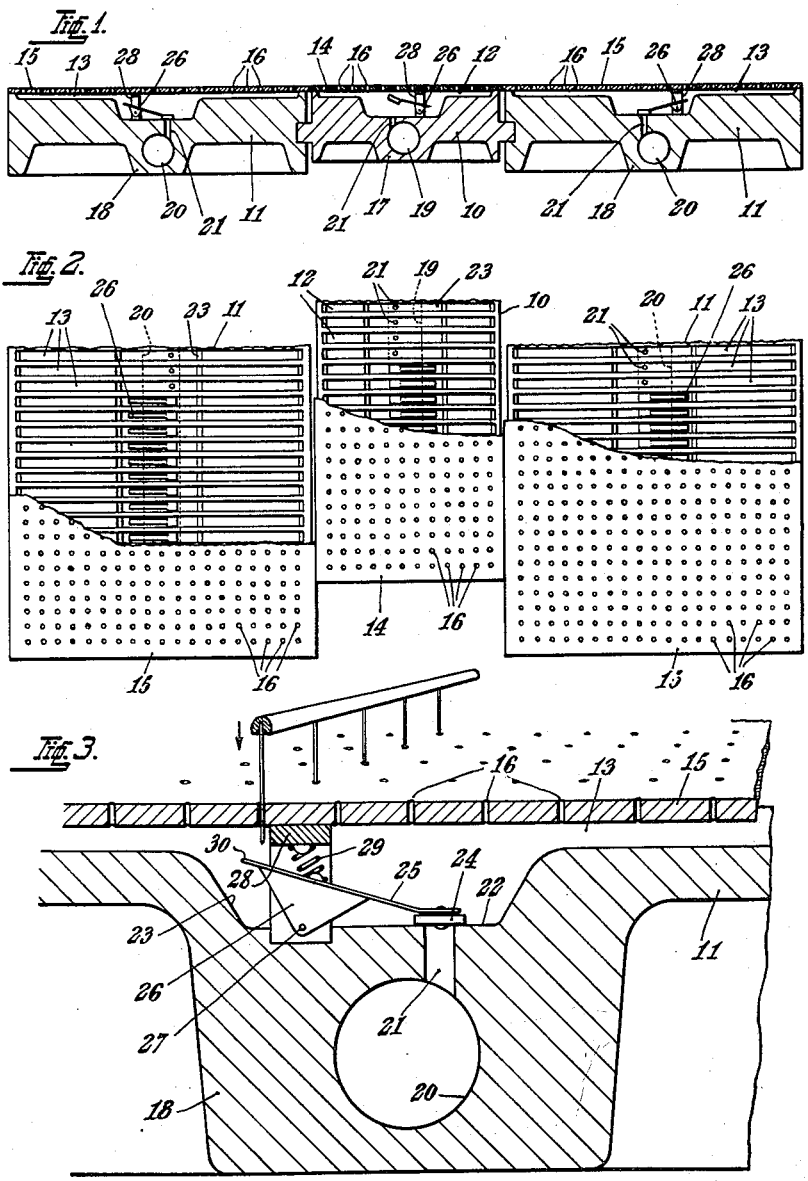

2,923,235

PRINTING TABLE WITH MOVABLE FEED CARRIAGE ON MULTI-COLOR PRINTING MACHINES

Heinrich Voegelin, Wiler near Utzenstorf, Switzerland, assignor to Fritz Buser A.G., Wiler near Utzenstorf, Switzerland, a corporation Application April 21, 1958, Serial No. 729,586

11 Claims. (Cl. 101—407)

This invention relates to printing tables on multicolor printing machines for printing on foil material which is impermeable to air.

For the production of multi-color printing on paper or on foils composed of metal or synthetic material on stereotype printing machines it has been proposed, for the purpose of intermittent feeding over the printing table, to apply by adhesion to an air-impermeable apron the air-impermeable foil material to be printed, this apron acting as a conveyor belt and being advanced intermittently or in relative fashion by an actuating mechanism, or to maintain the foil material pneumatically in firm contact with the surface of the table, which is furnished with suction apertures, the printing table having a table-top formed by a feed carriage and two stationary top portions flanking the said carriage on either side thereof, and the foil material being firmly held on the carriage upon the feed movement and on the stationary top portions upon the return movement of the carriage.

Feeding by means of an apron is suitable in the case of both a continuous web of foil and of separate sections, i.e., individual sheets of foil, but direct feeding is readily possible only in the case of a continuous web, whilst in the event of individual sheets it would be a matter of difficulty to adapt the size of the suction zone to different sizes of sheet. It would not be possible to build up to an adequate extent the negative pressure necessary to hold the sheets of foil, owing to the gaps between successive sheets. To overcome this drawback it is necessary for the parts of the table top furnished with suction apertures and not covered by the sheets of foil to be disconnected from the pneumatic system as required.

According to the invention this requirement is fulfilled by the fact that in the table top portions and in the feed carriage there are provided in each case below the table surface thereof a plurality of passages, which extend in a direction transversely to the direction of movement of the carriage and are disposed separately from one another side by side, each passage opening out in the surface of the table by way of a series of suction apertures running in the direction of the passage, and that each passage possesses a pneumatic feed pipe and a valve for opening or closing the said feed pipe selectively as desired.

In order that the invention may be more clearly understood, an embodiment thereof will now be described by way of example with reference to the accompanying drawing.

Fig. 1 shows a cross-section through the printing table.

Fig. 2 is a plan view of a part of the printing table with the table top partly broken away.

Fig. 3 shows to enlarged scale a detail of the cross-sectional view according to Fig. 1.

The printing table possesses a table-top feed carriage 10 for the intermittent feeding of foil material and two stationary top portions 11, which flank the said carriage on either side, and flush with which the carriage is arranged to be shiftable. The carriage 10 and the two top portions 11 are each furnished with a multiplicity of separate, adjacently disposed passages 12 and 13 respectively, which extend transversely to the direction of movement of the carriage over approximately the entire width of the respective portions of the table, and are covered in the upward direction by a surface sheet 14, 15 secured to the top portion and forming the flat surface of the table.

In this sheet there are drilled above each passage a series of suction apertures 16, which extends in the direction of the passage, and by means of which apertures the passage opens out into the surface of the table.

The carriage 10 and the table portions 11 each possess within a downwardly projecting longitudinal rib 17 and 18 respectively running parallel to the direction of movement of the carriage a pipe 19 and 20 respectively in communication with a pneumatic system, from which pipe is branched off a feed pipe 21 leading to each of the passages, this feed pipe opening out into the bottom 22 of a recess 23 (Fig. 3) in the passage and being capable at this point of being opened or closed as desired by the closing member 24 of a rocking valve located in the recess 23 in the passage. The closing member 24 is secured to one arm 25 of a two-armed lever 26, which is mounted by means of its pivot disposed transversely to the direction of the passage in an inverted U-shaped yoke piece 28 located in the passage, and is acted upon by the pressure of a coil spring 29, which bears against the yoke piece and causes the lever in each case after overreaching the middle point to snap into the open or closed position. The surface sheets 14 and 15 of the table bear against the middle portion of the yoke piece 28.

The two arms 25 and 30 of the valve lever 26 are each located under at least one of the suction apertures 16 pertaining to the respective passage, whereby the lever may be actuated for the purpose of closing the valve by depression of the lever arm 25 by means of a pin or the like introduced through the appropriate suction aperture, and in similar fashion for the purpose of opening the valve by depression of the lever arm 30. In the adjacently disposed passages of each top portion 10 and 11 the two suction apertures employed for actuation of the valve are each disposed at an equal distance apart in a straight line, these two rows registering with one another in all table top portions. Instead of operating the valves successively by means of a single pin or the like there may also be provided comb-like members, the teeth of which are arranged to coincide with the suction apertures in the rows and may accordingly be introduced simultaneously through the suction apertures of a row for the purpose of operating a valve by means of each tooth. For different sizes of the sheets of foil to be printed there may be provided comb members with teeth disposed accordingly, by means of which the zones for pneumatic retention on the printing table may be prepared in simple fashion as required. Retention of the foil is brought about in the case of open valve only if the passage is evacuated by the pneumatic system by way of the pipes 19, 21, or 20, 21 respectively.

The stationary table top portions may also be furnished with more than one row of passages 13 so as to render possible a variation of the zones in respect of pneumatic retention also transversely to the direction of movement of the carriage. Equally well there may be provided outwardly of the row of passages 13 a smaller number of suction apertures in the stationary table top portions, by means of which, in each table top portion, a separate hollow space communicating with the pipe 20 opens out toward the outside, which space, if not required, may be disconnected from the pipe 20 by means of a valve, and the evacuation of which in case of need, in the event of the suction apertures not all being closed, would not be greatly impaired by the passage of air through the apertures remaining uncovered. If the zone necessary for pneumatically holding the sheets of foil is narrower than the surface of the table furnished with the suction apertures, the marginal portions outside of the zone may also be covered in simple fashion by suitable covering strips, which are detachably secured to the surface of the table, for example by means of an adhesive.

What I claim is:

1. A printing table comprising, in combination, a movable table part including a body part movable in one direction, said body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means in each of said compartments movable between a position closing the respective duct and a position opening the respective duct; and means for opening and closing said valve means.

2. A printing table comprising, in combination, a movable table part including a body part movable in one direction, said body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means in each of said compartments movable between a position closing the respective duct and a position opening the respective duct; and means including a row of pins spaced the same distance as said perforations of said row of perforations and passing through one of said rows of perforations for operating said valve means.

3. A printing table comprising, in combination, a movable table part including a body part movable in one direction, said body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means in each of said compartments movable between a position closing the respective duct and a position opening the respective duct; and means including a row of pins spaced the same distance as said perforations of said row of perforations and passing through one of said rows of perforations for holding said valve means in said open position, and being adapted to hold said valve means in said closed position when placed in said other row of perforations.

4. A printing table comprising, in combination, a table part including a body part, said body part being formed with a suction conduit and with a plurality of compartments arranged in a row in one direction and with a duct connecting each of said compartments with said suction conduit; a top part secured to said body part and closing said compartments, said top part being formed with at least one row of perforations extending in said one direction, and one perforation of said row being located at each compartment and communicating with the respective compartment, said perforations being spaced in said one direction the same distance as said compartments; valve means in each of said compartments movable between a position closing the respective duct and a position opening the respective duct; and means for opening and closing said valve means.

5. A printing table comprising, in combination, two stationary table parts spaced from each other and a movable table part movable in the space between said stationary table parts in one direction, each of said table parts including a body part, each body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means in each of said compartments movable between a position closing the respective ducts and a position opening the respective ducts; and means for opening and closing said valve means.

6. A printing table comprising, in combination, two stationary table parts spaced from each other and a movable table part movable in the space between said stationary table parts in one direction, each of said table parts including a body part, each body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means in each of said compartments movable between a position closing the respective ducts and a position opening the respective ducts; and means including a row of pins spaced the same distance as said perforations of said row of perforations and passing through one of said rows of perforations for operating said valve means.

7. A printing table comprising, in combination, two stationary table parts spaced from each other and a movable table part movable in the space between said stationary table parts in one direction, each of said table parts including a body part, each body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means in each of said compartments movable between a position closing the respective ducts and a position opening the respective ducts; and means including a row of pins spaced the same distance as said perforations of said row of perforations and passing through one of said rows of perforations for holding said valve means in said open position, and being adapted to hold said valve means in said closed position when placed in said other row of perforations.

8. A printing table comprising, in combination, a movable table part including a body part movable in one direction, said body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means including two connected lever arms spaced transversely of said one direction and placed in register with said two associated perforations in each of said compartments movable between a position closing the respective duct and a position opening the respective duct; and means including a row of pins spaced the same distance as said perforations of said row of perforations and passing through one of said rows of perforations for holding said valve means in said open position, and being adapted to hold said valve means in said closed position when placed in said other row of perforations.

9. A printing table comprising, in combination, a movable table part including a body part movable in one direction, said body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means including two connected lever arms pivotally mounted on said body part at a point intermediate said lever arms and spaced transversely of said one direction and placed in register with said two associated perforations and spring means mounted in said body part arranged to provide snap action movement to said lever arms in each of said compartments movable between a position closing the respective duct and a position opening the respective duct; and means including a row of pins spaced the same distance as said perforations of said row of perforations and passing through one of said rows of perforations for holding said valve means in said open position, and being adapted to hold said valve means in said closed position when placed in said other row of perforations.

10. A printing table comprising, in combination, two stationary table parts spaced from each other and a movable table part movable in the space between said stationary table parts in one direction, each of said table parts including a body part, each body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction the same distance as said compartments; valve means including two connected lever arms spaced transversely of said one direction and placed in register with said two associated perforations in each of said compartments movable between a position closing the respective ducts and a position opening the respective ducts; and means including a row of pins spaced the same distance as said perforations of said row of perforations and passing through one of said rows of perforations for holding said valve means in said open position, and being adapted to hold said valve means in said closed position when placed in said other row of perforations.

11. A printing table comprising, in combination, two stationary table parts spaced from each other and a movable table part movable in the space between said stationary table parts in one direction, each of said table parts including a body part, each body part being formed with a suction conduit and with a plurality of compartments arranged in a row in said one direction and with a duct connecting each of said compartments with the suction conduit; a top plate secured to said body part and closing said compartments, said top plate being formed with at least two rows of perforations extending in said one direction, and two associated perforations of said two rows extending over each compartment in a transverse direction and communicating with the respective compartments, said associated perforations being spaced from other associated perforations in said one direction, the same distance as said compartments; valve means including two connected lever arms pivotally mounted in said body part at a point intermediate said lever arms and spaced transversely of said one direction and placed in register with said two associated perforations and spring means mounted in said body part arranged to provide snap action movement to said lever arms in each of said compartments movable between a position closing the respective ducts and a position opening the respective ducts; and means including a row of pins spaced the same distance as said perforations of said row of perforations and passing through one of said rows of perforations for holding said valve means in said open position, and being adapted to hold said valve means in said closed position when placed in said other row of perforations.

References Cited in the file of this patent

UNITED STATES PATENTS

| | | |
|---|---|---|
| 937,807 | Hodge | Oct. 26, 1909 |
| 1,162,658 | Schylander et al. | Nov. 30, 1915 |
| 1,196,676 | Gray | Aug. 29, 1916 |
| 2,538,972 | Magnani | Jan. 23, 1951 |
| 2,723,849 | Luhn | Nov. 15, 1955 |
| 2,753,181 | Anander | July 3, 1956 |